US010750576B2

(12) United States Patent
Lopez Matos et al.

(10) Patent No.: US 10,750,576 B2
(45) Date of Patent: Aug. 18, 2020

(54) HEATING UNIT (71) Applicants: HEWLETT-PACKARD DEVELOPMENT COMPANY, L.P., Houston, TX (US); Emilio Lopez Matos, Sant Cugat del Valles (ES); Jose Ma. Rio Doval, Sant Cugat del Valles (ES); Fernando Bayona Alcolea, Terrassa (ES)

(72) Inventors: Emilio Lopez Matos, Sant Cugat del Valles (ES); Jose Ma. Rio Doval, Sant Cugat del Valles (ES); Fernando Bayona Alcolea, Terrassa (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 383 days.

(21) Appl. No.: 15/541,396

(22) PCT Filed: Jan. 30, 2015

(86) PCT No.: PCT/EP2015/051994
§ 371 (c)(1),
(2) Date: Jul. 3, 2017

(87) PCT Pub. No.: WO2016/119896
PCT Pub. Date: Aug. 4, 2016

(65) Prior Publication Data
US 2018/0027611 A1 Jan. 25, 2018

(51) Int. Cl.
H05B 1/02 (2006.01)
G03G 15/20 (2006.01)
(Continued)

(52) U.S. Cl.
CPC ....... *H05B 1/0241* (2013.01); *G03G 15/2039* (2013.01); *G03G 15/80* (2013.01);
(Continued)

(58) Field of Classification Search
CPC ............... H05B 1/0241; H05B 3/0066; H05B 2003/014; H05B 1/02; H02M 1/42251
(Continued)

(56) References Cited

U.S. PATENT DOCUMENTS 5,925,278 A 7/1999 Hirst
6,091,612 A 7/2000 Blankenship
(Continued)

FOREIGN PATENT DOCUMENTS

EP 0921626 6/1999
JP 2010098878 4/2010

OTHER PUBLICATIONS

Comprehensive Study of Single-Phase AC-DC Power Factor Corrected Converters With high-frequency Isolation.
(Continued)

*Primary Examiner* — Mark H Paschall
(74) *Attorney, Agent, or Firm* — HP Inc. Patent Department (57) ABSTRACT

The present subject matter describes a heating unit. The heating unit comprises a heating element and a controlling unit coupled to the heating element to determine a desired value of a direct current (DC) voltage based on heating element parameters. The desired value is a value of DC voltage desired for operation of the heating element. The controlling unit computes a value of a duty cycle parameter based on device input parameters and the desired value of the DC voltage. The heating unit further comprises a power factor correction (PFC) unit coupled to the controlling unit and the heating element to convert an input alternating current (AC) voltage, received by the PFC unit from an AC supply, to a direct current (DC) voltage of the desired value based on the duty cycle parameter. The PFC unit provides the DC voltage to the heating element.

21 Claims, 5 Drawing Sheets (51) Int. Cl.
    *G03G 15/00*     (2006.01)
    *H05B 3/00*     (2006.01)
    *H02M 1/42*     (2007.01)

(52) U.S. Cl.
    CPC ........ *H02M 1/4225* (2013.01); *H05B 3/0066* (2013.01); *H05B 2203/014* (2013.01); *Y02B 70/126* (2013.01)

(58) Field of Classification Search
    USPC ................ 219/492, 490, 494, 497, 501, 212
    See application file for complete search history.

(56) References Cited

U.S. PATENT DOCUMENTS

| | | |
|---|---|---|
| 6,728,121 B2 | 4/2004 | Ben et al. |
| 7,002,265 B2 | 2/2006 | Potega |
| 7,015,682 B2 | 3/2006 | Santin et al. |
| 7,609,988 B2 * | 10/2009 | Kishi ................. G03G 15/2003 219/216 |
| 8,306,448 B2 * | 11/2012 | Claassen ............ G03G 15/2039 399/69 |
| 9,372,463 B2 * | 6/2016 | Shimura ............. G03G 15/2039 |
| 2011/0031914 A1 * | 2/2011 | Green ...................... H02P 6/20 318/400.11 |
| 2013/0043846 A1 | 2/2013 | Murdock et al. |
| 2013/0193133 A1 * | 8/2013 | Baumbach ............... H05B 6/04 219/488 |

OTHER PUBLICATIONS

Database WPI/Thomson Week 281831 1 August 2818 (2818-88-81)Thomson Scientific, London, GB:AN 2818-E64955 XP882749882, 5 JP 2818 898875 A (IUITA IND CO LTD).

Power Factor Correction (PFC) of AC-DC system using boost-converter.

\* cited by examiner

HEATING UNIT

BACKGROUND

Inkjet printing involves releasing droplets of printing fluid onto a print medium, such as paper. In order to accurately produce the details of the printed content, nozzles in a print head accurately and selectively release multiple drops of printing fluid, such as ink. The printing fluid drops released onto the print medium are in a liquid state and thus have to be heated to permanently form the desired printed content. Printers, such as the inkjet printers may thus include heating units for heating the printing fluid released on the print medium. For instance, a heating unit may be provided for drying wetting agents and other substances from the printing fluid drops, after the printing fluid drops have been released on to the print medium.

DETAILED DESCRIPTION

Devices, such as modern printers and web presses print content on a print medium, such as paper. Furthermore, in other types of devices such as 3D printers, successive layers of materials are formed to provide a 3-dimensional (3D) object. Such devices may further include heating units for heating the drops of printing fluid released on the print medium as a part of post-printing processing. Examples of the printing fluid include, but are not limited to, ink, varnishes, and gloss enhancers. The post processing permanently forms the printed content onto the print medium. Examples of such printers include, but are not limited to, printers using solvent ink or latex based ink. In such cases, the water content of the solvent ink is reduced when subjected to the heat treatment of by the heating unit. Similarly for latex ink, the wetting agents may be evaporated through the heating unit. In case of 3D printers, where a powdered material is used for creating the 3D object, the material may be treated using the heating units. Further, heating units may be used to speed up drying of printing fluids in high-speed web presses where printing generally takes less time than the time taken by the printing fluids to dry under ambient conditions.

The heating units generally include a heating element for transforming electric power into heat. The electric power is received from main power supply of the printers. Since the above described treatment of printing fluid is performed at high temperatures, a proportional amount of electric power is consumed by the heating unit. The electric power thus consumed forms a significant part of the total electric power consumed by the printer.

As the heating units use the electric power received from the main power supply of the printers, voltage and the frequency of the electric power may thus vary from one country to another. Generally, the voltage for alternate current (AC) power varies from 180 volts (V) to 240 V across different regions of the world, while the frequency vanes from 50 hertz (Hz) to 60 Hz. Owing to the difference in the voltage and the frequency of the main power supply on which the printers would operate, power rating of the heating units has to be accordingly varied across countries. Thus, different heating units have to be manufactured for use in the printers depending on the country of use of the printers. Manufacturing such different sets of heating units may result in an increase in costs involved in manufacturing and stock keeping of such differently manufactured heating units.

Also, such printers are used in home and office environments, as a result of which the printers and its components, such as the heating units have to comply with various regulations applicable for electric appliances. In one example, the regulations may relate to allowed harmonic distortion, power factor, radiated emissions, conducted emissions, radiated immunity, conducted immunity, and, flicker (voltage drop changes) associated with the heating unit. Manufacturing the heating units in accordance to such regulations may further result in increase in resource and cost utilization associated with printer manufacturing.

Approaches for correcting power factor of a heating unit of a printer are described. Such approaches may be implemented through a minimal circuit implemented within the heating unit, for correcting the power factor. As per an example of the present subject matter, the circuit for power factor correction of the heating unit is provided to enable use of same heating unit worldwide, irrespective of voltage and frequency ratings of a country, thus making the heating unit universally suitable for use in any region.

In accordance to an example of the present subject matter, the heating unit includes a heating element, a power factor correction (PFC) unit, and a controlling unit. The heating element is used for carrying out heat treatment of the printing fluid released on a print medium. Coupled to the heating unit is the PFC unit which converts an input AC voltage to a desired direct current (DC) voltage based on device input parameters, heating element parameters, and a duty cycle parameter for the heating element. Once converted, the PFC unit may further provide the DC voltage to the heating element.

As mentioned above, the PFC unit converts the input AC voltage based on device input parameters, heating element parameters, and a duty cycle parameter. In one example, device input parameters include parameters, such as the input AC voltage, input current, and a frequency corresponding to the input AC power received by the PFC unit from AC supply. Continuing with the above example, the heating element parameters may include parameters, such as the DC voltage, output current, and an actual temperature of the heating element. Furthermore, the duty cycle parameter which may be considered as defining a duty cycle according to which an amplifier of the PFC unit varies a voltage level of the DC voltage to obtain the desired value of the DC voltage. The desired value of the DC voltage is determined by the controlling unit based on the heating element parameters.

Amongst the aforementioned parameters, in one example, the device input parameters and the heating element parameters may be determined by the controlling unit. Based on the heating element parameters, the controlling unit computes an operable value of DC power provided by the PFC unit to the heating element. The operable value may be considered as a value desirable for operation of the heating element. The controlling unit computes a value of the duty cycle parameter based on the operable value of the DC power and the device input parameters. Thereafter, the controlling unit may provide the value of the duty cycle parameter to the PFC unit for correcting the power factor of the heating unit for obtaining the DC power of the operable value. The PFC unit thus provides the DC power of the operable value to the heating element for efficient operation.

Further, since power and voltage are proportional to each other, the operable value of the DC power is proportional to the desired value of the DC voltage. The PFC unit thus obtains the DC voltage of the desired value for being provided to the heating element.

The approaches as described above, facilitate in converting input AC voltage to the DC voltage having value desirable for operation of the heating element. As the value of the DC voltage is achieved irrespective of the input AC voltage, the heating unit can be used for printers worldwide, without any structural or electrical modifications. Such a universal heating unit helps in minimizing the manufacturing and stock keeping costs as a single stock can now be maintained for all printers. Further, since the heating unit correctly utilizes power factor correction to achieve the DC power and in turn the DC voltage at the operable level, thus even low input AC power can be used to efficiently operate the heating element the heating unit may thus facilitate in reducing power consumption of the printer, thus reducing operational costs for a user of the printer.

Additionally, since the desired value of the DC voltage is determined based on the device input parameters and the heating element parameters, the heating unit complies with the various worldwide regulations as previously described. For instance, since the heating unit takes into account the temperature of the heating unit, it maintains the emissions and heat generated by the printer. Further, since the heating unit uses a minimal circuitry having few basic electronic components, the heating unit can be manufactured at a very low cost.

The present subject matter is further described with reference to FIGS. 1 to 4. It should be noted that the description and figures merely illustrate principles of the present subject matter. It is thus understood that various arrangements may be devised that, although not explicitly described or shown herein, embody the principles of the present subject matter. Moreover, all statements herein reciting principles, aspects, and examples of the present subject matter, as well as specific examples thereof, are intended to encompass equivalents thereof.

Figure 1A:
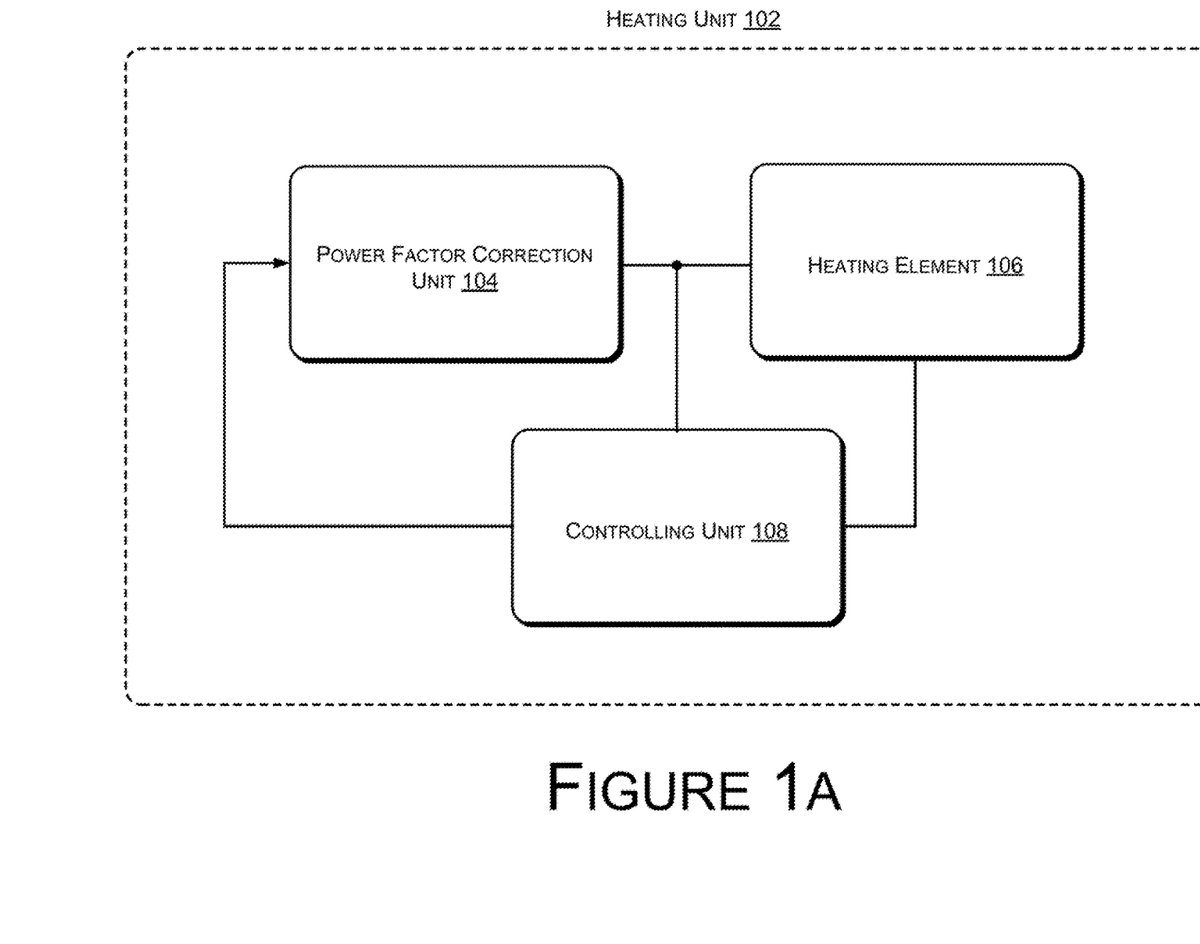
FIG. 1A illustrates a block diagram of a heating unit, according to an example of the present subject matter.

FIG. 1A illustrates a heating unit 102, according to an example of the present subject matter. The heating unit 102 as described may be used in a device (not shown in the figure) involving a heat treatment process. The heating unit 102 includes a power factor correction (PFC) unit 104, a heating element 106 coupled to the PFC unit 104 via a voltage bus (not shown in this figure), and a controlling unit 108 coupled to the PFC unit 104 and the heating element 106 via the voltage bus.

In one example, the controlling unit 108 initially determines a desired value of a direct current (DC) voltage based on heating element parameters. The desired value is defined as a value of DC voltage desired for operation of the heating element 106. The controlling unit 108 further computes a value of a duty cycle parameter based on device input parameters and the desired value of the DC voltage. The controlling unit 108 may subsequently provide the duty cycle parameter to the PFC unit 104.

Based on the duty cycle parameter, the PFC unit 104 may convert an input alternating current (AC) voltage to a direct current (DC) voltage of the desired value. In one example, the PFC unit 104 may receive the input AC voltage from an AC supply of the printer. Once obtained, the PFC unit 104 may further provide the DC voltage to the heating element 106. The heating unit 102, thus obtains the DC voltage, and in turn DC power, desired for efficient operating of the heating element 106 irrespective of the input AC voltage.

Figure 1B:
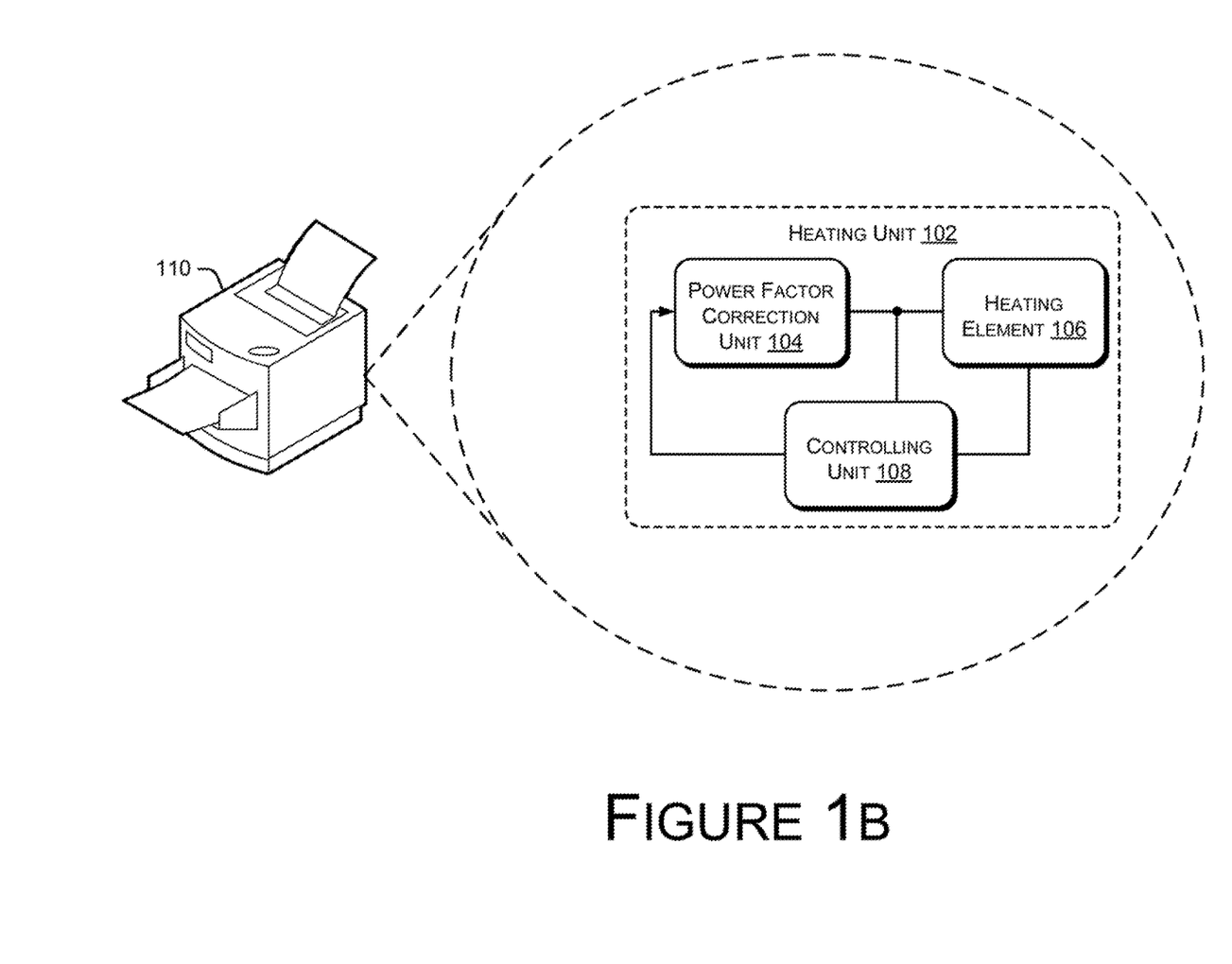
FIG. 1B illustrates a printer incorporating a heating unit, according to an example of the present subject matter.

FIG. 1B illustrates a printer 110 incorporating a heating unit 102, according to an example of the present subject matter. In one example, the heating unit 102 heats a printing fluid released on a print medium. As illustrated, the heating unit 102 includes the PFC unit 104, the heating element 106, and the controlling unit 108.

As previously described, the controlling unit 108 computes a value of a duty cycle parameter based on the device input parameters and the heating element parameters. The controlling unit 108 may subsequently provide the duty cycle parameter to the PFC unit 104 for correcting a power factor of the heating unit 102 for obtaining a DC power of the operable value. The operable value is defined as a value desired for operation of the heating element 106.

Based on the duty cycle parameter, the PFC unit 104 may correct the power factor of the heating unit 102 to obtain the DC power of the operable value. Once obtained, the PFC unit 104 may further provide the DC power to the heating element 106. The heating unit 102 thus achieves the corrected power factor for obtaining the DC power, and in turn the DC voltage, desired for efficient operating of the heating element 106 irrespective of the input AC power.

Figure 2:
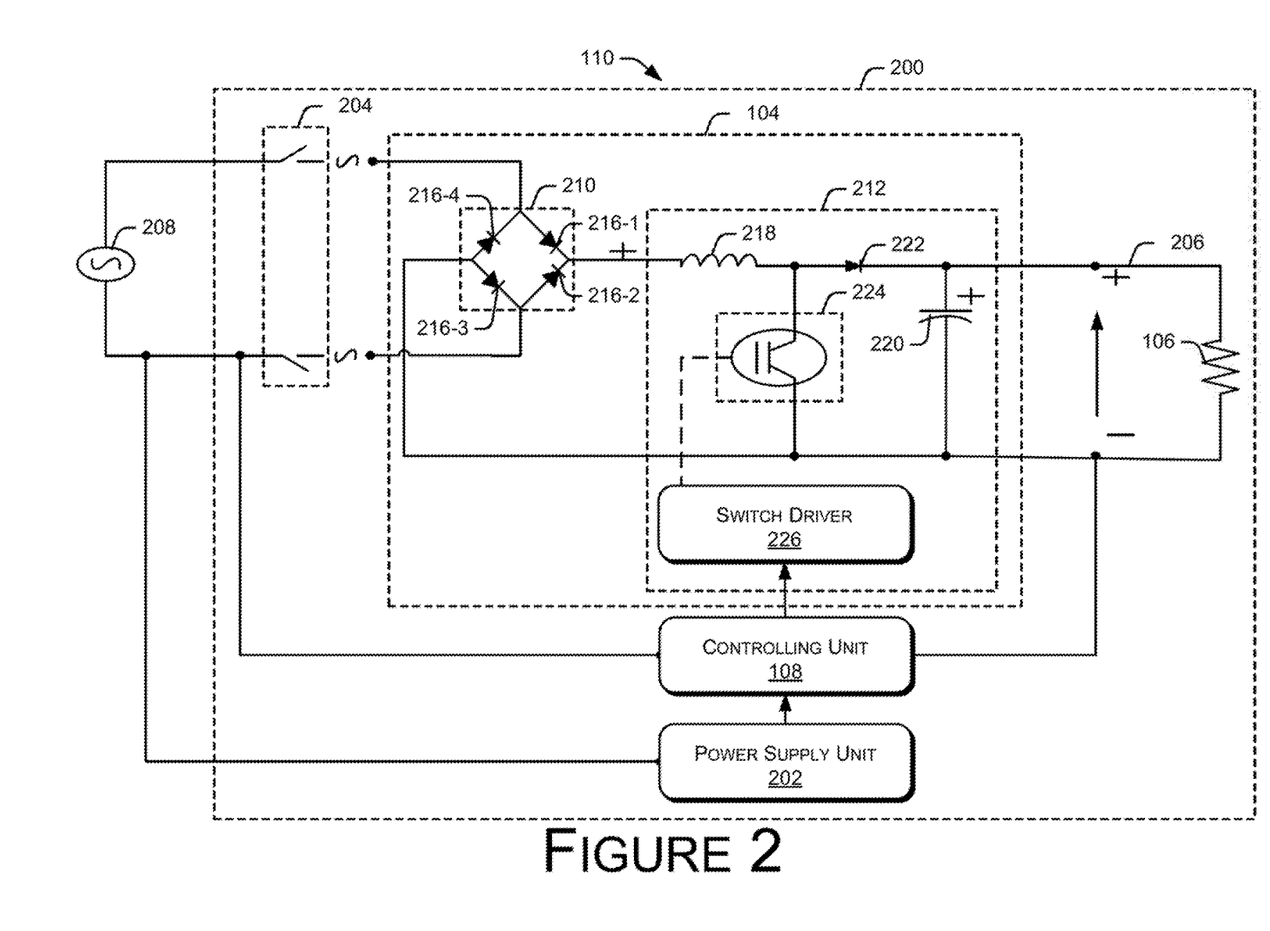
FIG. 2 illustrates a logical circuit of a heating unit, according to yet another example of the present subject matter.

FIG. 2 illustrates a circuit 200 of a heating unit, according to yet another example of the present subject matter. In one example, the logical circuit 200 is implemented in the heating unit 102. As previously described, the heating unit 102 as described may be used in a device, such as a printer for heating printing fluid released on a print medium. Examples of such printers include, but are not limited to, inkjet printers using solvent printing fluid or latex based ink. Examples of the printing fluid include, but are not limited to, ink, varnishes, and gloss enhancers. Similarly, 3D printers may utilize printing fluids which may be liquid-based or powdered based. In one example, the heating unit 102 may be provided for heating the drops of printing fluid released on the print medium as a part of post-printing processing. The post-printing processing of the printing fluid permanently forms the printed content onto the print medium. For instance, in case of the printing fluid being ink, as the ink drops are released in a liquid state, the ink drops have to be dried in order to facilitate quick absorption of the ink by the print medium. In such cases, the water content of the solvent ink is reduced when subjected to the heat treatment by the heating unit 102.

In case of latex ink, the heating unit 102 may be provided for evaporating wetting agents and, humectant from the ink drops. In case of latex ink, the heating unit 102 may be further used for curing the ink drops at high temperatures for performing a polymerization process to achieve high print quality. The heating unit 102 may be further used for condensation of non-desired vapor from the print medium after the ink drops have been dried. Although the logical circuit has been explained in great detail in regards to the printing fluid being an ink the heating unit 102 may be used for drying other printing fluids, such as varnishes, and gloss enhancers.

In one example, the logical circuit 200 implementing the heating unit 102 includes the PFC unit 104, the heating element 106, the controlling unit 108, a power supply unit (PSU) 202, an AC switch 204, and a voltage bus 206. As illustrated, the AC switch 204 couples the PFC unit 104 to an AC supply 208 of the printer 110 for receiving the input AC power from the AC supply 208. For instance, one end of the AC switch 204 is coupled to the AC supply 208 to receive the input AC voltage and another end is coupled to the PFC unit 104 to transmit the input AC voltage to the PFC unit 104. In one example, the AC switch 204 may be implemented using either a relay or an active device, such as a triode for alternating current (TRIAC) and an insulated-gate bipolar transistor (IGBT).

The AC switch 204 regulates power transmission between a power supply, such as the AC supply 208 and the printer 110 and its components, such as the heating unit 102. For instance, the AC switch 204 may regulate power transmission to prevent instant start-up of the printer 110 upon being plugged in to the AC supply 208. In one example, the AC switch 204 regulates the power transmission based on an input from the controlling unit 108. The controlling unit 108 may instruct the AC switch 204 to enable the high power connection between the AC supply 208 and the printer 110 upon completion of startup diagnosis routines, as will be explained in greater details in the following paragraphs. In one example, the startup diagnosis routines may be performed in accordance to safety regulations prescribed for electric components.

The controlling unit 108 is coupled to the PFC unit 104, the heating element 108, the voltage bus 206, and the AC switch 204 for determining the duty cycle parameter and for performing the startup diagnosis routines. In one example, the controlling unit 108 may be implemented using device, such as an 8 or 32 bit microcontroller, a digital signal processor (DSP), and a field programmable gate array (FPGA). As previously described, the controlling unit 108 performs various functionalities, such as computing the duty cycle parameter and performing the startup diagnosis routines. For instance, before the AC switch 204 is closed for connecting the PFC unit 104 to the AC supply 208, the controlling unit 108 performs the startup diagnosis routines to confirm whether the logical circuit 200 is in working condition. Once the AC switch 204 is closed, the controlling unit 108 initiates computing the duty cycle parameter to correct the power factor of the heating unit 102, for example, to maintain the value of the power factor close to one. Further, the controlling unit 108 computes the duty cycle parameter such that the DC voltage across voltage bus 206 does not exceed the maximum tolerable operable limit of the logical circuit 200.

In one example, the controlling unit 108 is supplied operating power by the PSU 202 as the controlling unit 108 has to be powered up before the rest of the logical circuit 200 to perform the startup diagnosis routines. The PSU 202 may be an AC/DC power supply capable of converting AC power supply to DC power supply for being provided to the controlling unit 108. As illustrated, the PSU 202 may be coupled to the AC supply 208 for receiving the AC supply 208. In one example, the PSU 202 may be implemented using a flyback isolated Switched Mode Power Supply (SMPS) (not shown in the figure) a DC/DC buck-converter (not shown in the figure) for generating the DC power supply for the controlling unit 108. The DC power supply, in one example, may be equal to five volts.

In one example, the heating element 106 may be implemented using a heat generating element, such as wounded wire resistor, an infrared (IR) lamp, and a wounded resistor with ceramic support. As illustrated, the heating element 106 is coupled to the PFC unit 104 via the voltage bus 206 for receiving the DC power for transforming DC power into heat. On being supplied the DC power, electric current starts flowing through the heating element 106, thus producing heat because of Joule's effect. This heat is proportional to the squared current and in turn to squared DC voltage across the voltage bus 206, i.e., the DC voltage supplied by the PFC unit 104. Although, a single heating element 106 is illustrated in the FIG. 2, more than one heating elements 106 may be provided in the heating unit 102.

As previously described, the PFC unit 104 is coupled to the heating element 106 via the voltage bus 206 for providing the DC power of the operable value to the heating element 106. In one example, the PFC unit 104 includes a rectifier 210 to convert the input AC voltage to an intermediate DC voltage and an amplifier circuit 212 to vary the intermediate DC voltage to obtain the DC voltage of the desired value based on the value of the duty cycle parameter. The rectifier 210, in one example, may be a full-wave bridge rectifier having four diodes 216-1, 216-2, 216-3, and 216-4, hereinafter collectively referred to as rectifier diodes 216. The amplifier circuit 212, in one example, may be a boost convertor and includes a conductor 218, a capacitor 220, a diode 222, an active switch 224, and a switch driver 226. In one example, the active switch 224 may be an insulated-gate bipolar transistor (IGBT).

In operation, as the printer 110 is connected to the AC supply 208, the PSU 202 starts supplying the DC power supply to controlling unit 108. Once, the controlling unit 108 receives a request, for example, from the print head of the printer 110 for initiating the heat treatment for the ink, the controlling unit 108 subsequently initiates the startup diagnosis routines. The controlling unit 108 may initiate the startup diagnosis routines to check whether various components of the heating unit 102 are properly connected and functioning. Upon successful completion of the startup diagnosis routines, i.e., upon determining the components to be connected and functioning properly, the controlling unit 108 instructs the AC switch 204 to enable the connection between the heating unit 102 and the AC supply 208. As previously described, the AC supply 208 is connected to the PFC unit 104 via the AC switch 204 owing to which the PFC unit 104 starts receiving the input AC voltage. Although, for the sake of brevity, and not as a limitation, the operation of the heating unit 102 will be majorly described in terms of voltage in the following paragraphs, it will be understood that since power and voltage are proportional to each other, the description of the heating unit 102 will also cover generation of DC power.

Once AC supply 208 is connected to the heating unit 102, the controlling unit 108 measures the device input parameters and the heating element parameters. In one example, the device input parameters include the input AC voltage, input current, and a frequency corresponding to the input current. The heating element parameters include the DC voltage, output current, and an actual temperature of the heating element 106. The input current is the current across the AC switch 204 and corresponds to the input AC voltage and in turn the input AC power. The output current is the current across the voltage bus 206 and corresponds to the DC voltage provided by the PFC unit 102 and in turn the DC power. The controlling unit 108 may measure the device input parameters across the AC switch 204 and the heating element parameters across the voltage bus 206 and the heating element 106. For instance, the controlling unit 108 may measure the DC voltage and the output current across the voltage bus 206 and the actual temperature across the heating element 106.

Based on the device input parameters and the heating element parameters, the controlling unit determines a value of bus voltage, i.e., voltage across the voltage bus 206 to determine if the bus voltage is equal to a default voltage. In one example, the default voltage may be equal to a default DC voltage that should be supplied to the voltage bus 206 by the PFC unit 102 with the AC supply 208 connected and the active switch 224 in an open state. For instance, as the AC supply 208 is connected to the heating unit 102, the input AC voltage is initially applied across the rectifier 210 of the PFC unit 104. The rectifier 210 converts the input AC voltage to the intermediate DC voltage. In one example, the active switch 224 of the PFC unit 104 is initially in the open state when the AC supply 208 is connected to the heating unit 102. The rectifier 210 in such a case acts as full-wave AC/DC rectifier. Further, as the active switch 224 is in the open state, the amplifier circuit 212 does not amplify the intermediate DC voltage and the intermediate DC voltage is subsequently transmitted to the voltage bus 206 via the conductor 218, the capacitor 220, and the diode 222. Value of the intermediate DC voltage and the default voltage in such a case may be governed by equation 1 as follows:

$$V_{Voltage\ bus}^{DC} = \frac{2}{\pi}\left(V_{AC}^{peak} - 3*V_{diode}\right) \quad (1)$$

where, $V_{Voltage\ bus}^{DC}$ is the DC voltage across the voltage bus 206, which is same as the intermediate DC voltage, $V_{AC}^{peak}$ is the input AC voltage, and $V_{diode}$ is diode forward voltage of the rectifier diodes 216 and the diode 222.

Once the intermediate DC voltage is applied across the voltage bus 206, the controlling unit 108 measures the value of bus voltage to determine if the bus voltage is not equal to the default voltage. In case the bus voltage is not equal to the default voltage, the controlling unit 108 may determine that the heating unit 102 is not working properly. In case the bus voltage is equal to the default voltage, the controlling unit 108 may determine that the heating unit 102 is working properly and the voltage bus 206 is connected to the PFC unit 104.

The controlling unit 108 may subsequently use the heating element parameters to determine the desired value of the DC voltage that has to be supplied to the heating element 106 for operation, i.e., for heating the printing fluid and the print medium. The controlling unit 108 may initially determine a desired temperature of the heating element 106, i.e., the temperature at which the heating element 106 should dissipate heat for heat treatment of the ink. In one example, the controlling unit 108 may determine the value of the desired temperature based on the request received from a print head of the printer 110 for initiating the heat treatment for the printing fluid. For instance, the print head may indicate the desired temperature. In another example, the desired temperature may be set as default, for example, as a part of printer settings. Based on the desired temperature and the actual temperature of the heating element 106, the controlling unit 108 may determine the amount of heat that the heating element 106 has to generate to, achieve the desired temperature.

The controlling unit 108 may subsequently determine the operable value of the DC power that may be provided to the heating element 106 to achieve the desired temperature. In one example, the controlling unit 108 may determine the operable value of the DC power based on the principle that heat generated by the heating element 106 is proportional to the DC power supplied to the heating element 106. Upon determining the operable value of the DC power, the controlling unit 108 may determine the desired value of the DC voltage that may be supplied to the heating element for operation. In one example, the controlling unit 108 may determine the desired value of the DC voltage using the relationship between the DC power and DC voltage as illustrated by equation 2 below:

$$P_{DC} = \frac{V_{DC}^2}{R_{heater}} \quad (2)$$

where $P_{DC}$ is the DC power, $V_{DC}$ is the DC voltage, and $R_{heater}$ is the resistance of the heating element 106.

The controlling unit 108 may subsequently determine the value of the duty cycle parameter based on the desired value of the DC voltage and the device input parameters. In one example, the controlling unit 108 may determine the value of the duty cycle parameter using a relationship between the desired value of the DC voltage, the input AC voltage, and the $V_{diode}$, as defined by the equation 3 provided below:

$$V_{Desired\ value}^{DC} = \left(\frac{1}{1-D}\right)*\frac{2}{\pi}\left(V_{AC}^{peak} - 3*V_{diode}\right) \quad (3)$$

where, $V_{District\ value}^{DC}$ the desired value of the DC voltage, D is the value of the duty cycle parameter, $V_{AC}^{peak}$ is the input AC voltage, and $V_{diode}$ is the diode forward voltage of the rectifier diodes 216 and the diode 222.

In one example, the controlling unit 108 may determine the value of the duty cycle parameter such that a shape of the input current follows a shape of the input AC voltage. Making the shape of the input current follows a shape of the input AC voltage, facilitates the PFC unit 104 to obtain a power factor closest to one.

The controlling unit 108 may then provide the value of the duty cycle parameter to the PFC unit 104 for correcting the power factor of the heating unit 102 for obtaining the DC voltage of the desired value. In one example, the controlling unit 108 may provide the duty cycle parameter to the active switch 224 of the PFC unit 104 via the switch driver 226. As illustrated in the FIG. 2, the switch driver 226 is coupled to the controlling unit 108 and a gate of the active switch 224. In one example, the controlling unit 108 may provide the duty cycle parameter in the form of an electric signal, which is further amplified by the switch driver 226 before being applied to the gate of the active switch 224. For instance, in case of the active switch 224 being an IGBT, the controlling unit 108 may provide the value of the duty cycle parameter in the form of a pulse width modulated (PWM) signal. The PWM signal in such a case will have a duty cycle equal to the value of the duty cycle parameter. Thus, a pulse width, indicating the ON time, of the PWM signal will be in accordance to the value of the duty cycle parameter. The controlling unit 108 may provide the PWM signal to the switch driver 226 which may amplify the pulse width modulated signal and provide the amplified pulse width modulated signal to the active switch 224. In one example, the switch driver 226 may be a boost amplifier.

As previously described, the active switch 224 is initially in an open state and gets activated upon receiving the duty cycle parameter from the controlling unit 108 to enter in a closed state. As the active switch 224 gets activated, the amplifier circuit 212 also starts amplifying the intermediate DC voltage provided by the rectifier 210. In one example, upon getting activated, the active switch 224 starts regulating the switching of the amplifier circuit 212 based on the value of the duty cycle parameter. For instance, in case of the active switch 224 being an IGBT, the active switch 224 may regulate the switching of the amplifier circuit 212 based on the pulse width of the PWM signal.

The amplifier circuit 212 may thus vary the intermediate DC voltage based on the duty cycle parameter to obtain the DC voltage of the desired value. For instance, if the value of the duty cycle parameter is equal to zero, the amplifier circuit 212 may function as a filter circuit and the DC voltage at the voltage bus 206 will thus be equal to the intermediate DC voltage. If the value of the duty cycle parameter is greater than zero, the intermediate DC voltage is amplified in proportion to the value of the duty cycle parameter. The DC voltage at the heating element 106 may thus be increased over time depending on the duty cycle parameter obtain the DC voltage of the desired value. The value of the DC voltage varies based on the duty cycle parameter in accordance to the relationship as previously described in the equation 3.

The DC voltage of the desired value is subsequently provided to the heating element 106 via the voltage bus 206. The heating element 106 in, turn transforms the DC power corresponding to the DC voltage to heat to perform the heat treatment of the printing fluid. The controlling unit 108 and the PFC unit 104 thus facilitate in correcting the power factor of the heating unit 102 for achieving the DC voltage of the desired value and in turn the DC power of the operable value.

Further, the controlling unit 108 regularly monitors the device input parameters and the heating element parameters to ascertain if either the duty cycle parameter or the desired value of the DC voltage has to be modified. For instance, in case after some time of operation, the actual temperature of the heating element 106 may increase beyond the desired temperature or a maximum prescribed temperature, the DC voltage applied to the heating element 106 in such a case may have to be reduced. The controlling unit 108 may thus use the heating element parameters to ascertain an updated desired value of the DC voltage. In case the updated desired value of the DC voltage is greater or lesser than a current desired value of the DC voltage, the controlling unit 108 may recalculate the duty cycle parameter for adjusting the DC voltage provided by the PFC unit 104. The controlling unit 108 may otherwise continue providing the PWM signal in accordance to a current duty cycle parameter.

Further, in case the input AC voltage may suddenly reduce or increase, for example, owing to fluctuations, the duty cycle parameter may have to be varied to achieve the desired value of the DC voltage. The controlling unit 108 in such a case may thus use the device input parameters, such as the input AC voltage to ascertain if the duty cycle parameter has to be adjusted, i.e., increased or decreased for obtaining the desired value of the DC voltage.

The heating unit 102 thus dynamically corrects the power factor for obtaining the DC voltage of the desired value and in turn the DC power of the operable value.

Figure 3:
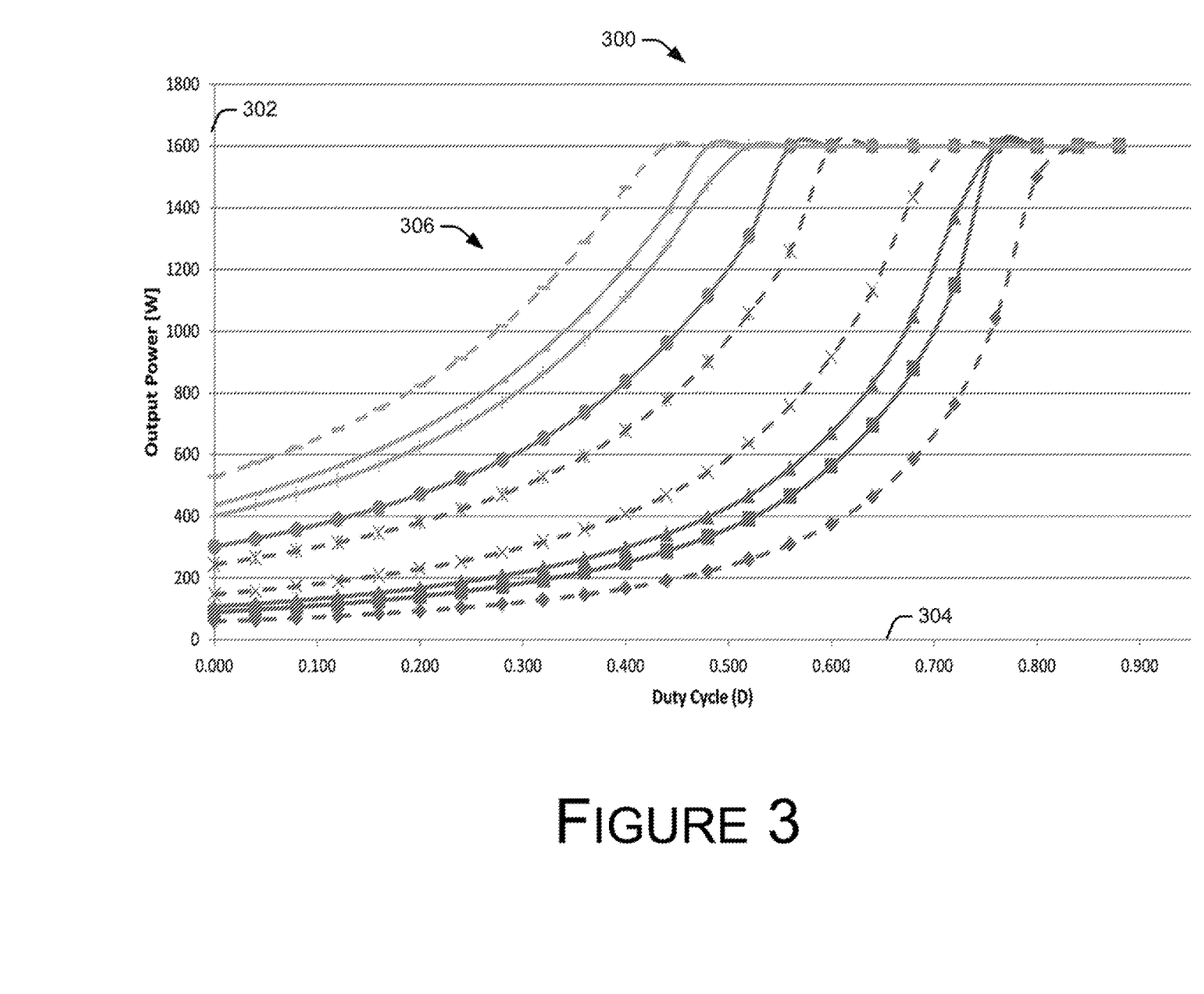
FIG. 3 provides a graphical representation depicting direct current power variations across a heating unit, according to an example of the present subject matter.

FIG. 3 provides a graphical representation 300 depicting DC power variations across a heating unit, according to an example of the present subject matter. In one example, the DC power variations are measured across the heating unit 102. Furthermore, the graph 300 is provided for sake of illustration and should not be construed as a limitation. Other graphs depicting such variations would also be within the scope of the present subject matter. The graph 300 depicts duty cycle 302 and DC power 304. The duty cycle 302 may be computed and provided by a controlling unit, such as the controlling unit 108. The DC power 304 is provided by a PFC unit, such as the PFC unit 104 in accordance to the duty cycle. As previously explained, the PFC unit 104 converts input AC power to obtain DC power of the operable value based on the duty cycle parameter indicated by the duty cycle 302. The DC power obtained by converting different values of the input AC power is represented using DC power curves as indicated by an arrow 306.

In one example, the input AC power ranges from a minimum value of 74 Watts (W) at 100 volts (V) and 453 W at 240 V, to a maximum value of 1,600 W for all voltage levels. As illustrated, the minimum DC power obtained by converting the various AC input power ranging from 110 root-mean-squared voltage (Vrms) to 240 Vrms varies from 90 Watts (W) to 435 W, respectively. In one example, the minimum DC power is obtained when the value of the duty cycle parameter (D) is equal to zero. Further, the maximum DC power achieved is 1,600 W. The maximum DC voltage across the voltage bus 206 in such a case is 400 volts, with the resistance of the heating element used in the heating unit being 100 ohm.

Figure 4:
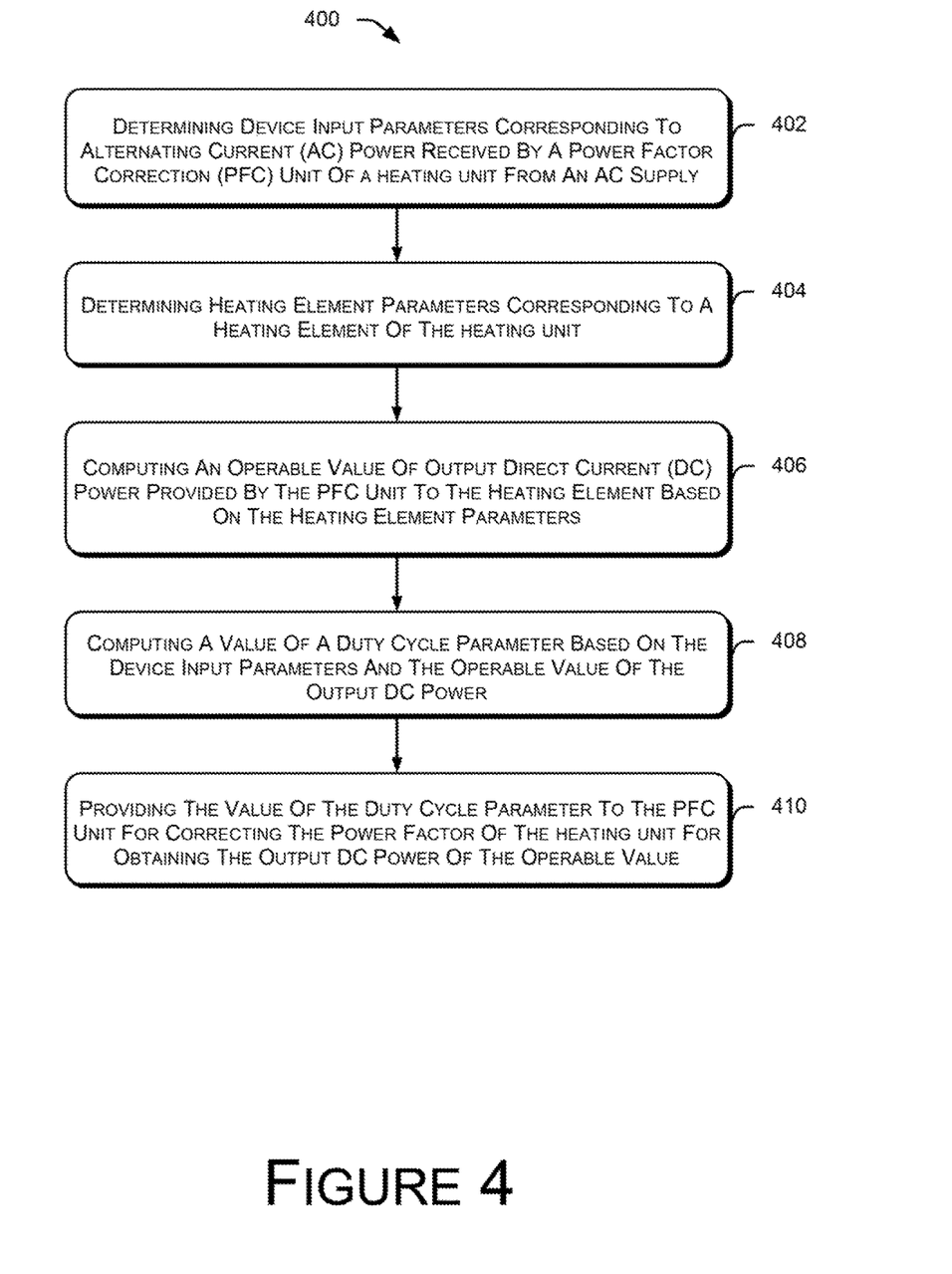
FIG. 4 illustrates a method of correcting power factor of a heating unit of a printer, according to an example of the present subject matter.

FIG. 4 illustrates a method 400 of correcting power factor of a heating unit of a printer, according to an example of the present subject matter. The order in which the method 400 is described is not intended to be construed as a limitation, and any number of the described method blocks may be combined in any order to implement the method 400 or an alternative method.

Further, although the method 400 for correcting power factor of a heating unit of a printer may be implemented in a variety of logical circuits; in an example described in FIG. 4, the method 400 is explained in context of the aforementioned heating unit 102.

Referring to FIG. 4, at block 402 device input parameters corresponding to alternating current (AC) power received by a power factor correction (PFC) unit of a heating unit is determined. The AC power is received by the PFC unit, for example, the PFC unit 104 from an AC supply, for example, the AC supply 208. Examples of the device input parameters include input AC voltage corresponding to the AC power, input current, and a frequency corresponding to the input current.

At block 404, heating element parameters corresponding to a heating element of the heating unit are determined. Examples of the heating element parameters include the DC voltage, output current, and an actual temperature of the heating element.

At block 406, an operable value of direct current (DC) power provided by the PFC unit 104 to the heating element is computed. The operable value is a value desired for operation of the heating element 106 of the heating unit 102. In one example, the operable value is computed based on the heating element parameters.

At block 408, a value of a duty cycle parameter is computed. In one example, the duty cycle parameter is computed based on the device input parameters and the operable value of the DC power.

At block 410, the value of the duty cycle parameter is provided to the PFC unit for correcting the power factor of the heating unit. In one example, the power factor of the heating unit is corrected for obtaining the DC power of the operable value.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A heating unit comprising:
   a heating element;
   a controller coupled to the heating element to:
     receive a measured actual temperature in the heating unit;
     determine a target value of a direct current (DC) voltage for operation of the heating element based on heating element parameters comprising the measured actual temperature; and
     compute a value of a duty cycle parameter based on device input parameters and the target value of the DC voltage; and
   a power factor correction (PFC) unit comprising a rectifier and coupled to the controller and the heating element, wherein the PFC unit is to:
     convert an input alternating current (AC) voltage, received by the PFC unit from an AC supply, to the DC voltage of the target value based on the value of the duty cycle parameter; and
     provide the DC voltage of the target value to the heating element.

2. The heating unit of claim 1, wherein the rectifier is to convert the input AC voltage to an intermediate DC voltage, and wherein the PFC unit further comprises:
   an amplifier coupled to the rectifier, wherein the amplifier is to produce, from the intermediate DC voltage, the DC voltage of the target value based on the value of the duty cycle parameter.

3. The heating unit of claim 2, wherein the amplifier comprises an active switch coupled to the controller, the active switch to:
   receive a signal corresponding to the value of the duty cycle parameter from the controller; and
   regulate switching of the amplifier based on the signal corresponding to the value of the duty cycle parameter to obtain the DC voltage of the target value.

4. The heating unit of claim 3, wherein the active switch comprises an insulated-gate bipolar transistor, and wherein signal comprises a pulse width modulated signal from the controller.

5. The heating unit of claim 1, further comprising an AC switch to control supply of the input AC voltage to the heating unit, wherein a first end of the AC switch is to receive the input AC voltage from the AC supply, and a second end of the AC switch is coupled to the PFC unit to transmit the input AC voltage to the PFC unit.

6. The heating unit of claim 5, wherein the controller is coupled to the AC switch to measure the device input parameters.

7. The heating unit of claim 6, wherein the device input parameters include the input AC voltage, an input current, and a frequency corresponding to the input current.

8. The heating unit of claim 1, wherein the heating element parameters further include the DC voltage and an output current.

9. A method comprising:
   receiving device input parameters corresponding to an alternating current (AC) power received by a power factor correction (PFC) unit of a heating unit from an AC supply;
   receiving heating element parameters corresponding to a heating element of the heating unit, the received heating element parameters comprising a measured actual temperature of the heating element;
   computing, by a controller, an operable value of direct current (DC) power provided by the PFC unit to the heating element based on the heating element parameters comprising the measured actual temperature of the heating element, wherein the operable value of the DC power is a target value for operation of the heating element of the heating unit;
   computing, by the controller, a value of a duty cycle parameter based on the device input parameters and the operable value of the DC power; and
   providing, by the controller, the value of the duty cycle parameter to the PFC unit for converting the AC power to the DC power of the operable value.

10. The method of claim 9, wherein the providing comprises:
    generating, by the controller, a pulse width modulated (PWM) signal indicating the value of the duty cycle parameter; and
    transmitting, by the controller, the PWM signal to an active switch of the PFC unit to regulate switching of an amplifier of the PFC unit based on the value of the duty cycle parameter to obtain the DC power of the operable value.

11. The method of claim 9, further comprising:
    converting the AC power to an intermediate DC power; and
    varying a level of a voltage corresponding to the intermediate DC power to obtain the DC power of the operable value based on the value of the duty cycle parameter.

12. The heating unit of claim 1, wherein the measured actual temperature is an actual temperature of the heating element.

13. The heating unit of claim 12, wherein the controller is to:
    receive an updated actual temperature of the heating element;
    in response to the updated actual temperature, determine a different target value of the DC voltage; and
    compute a different value of the duty cycle parameter based on the device input parameters and the different target value of the DC voltage.

14. The heating unit of claim 13, wherein the PFC unit is to:
    convert the AC voltage to the DC voltage of the different target value based on the different value of the duty cycle parameter; and
    provide the DC voltage of the different target value to the heating element.

15. The heating unit of claim 1, wherein the device input parameters comprise a first parameter selected from among a value of the input AC voltage, a value of an input current from the AC supply, or a value of a frequency of the input AC voltage, and wherein the controller is to:
    receive an updated value of the first parameter; and
    in response to the updated value of the first parameter, compute a different value of the duty cycle parameter based on the target value of the DC voltage and the device input parameters comprising the updated value of the first parameter.

16. The method of claim 9, further comprising:
receiving, by the controller, an updated actual temperature of the heating element;
in response to the updated actual temperature, computing, by the controller, a different operable value of the DC power; and
computing, by the controller, a different value of the duty cycle parameter based on the device input parameters and the different operable value of the DC power.

17. The method of claim 16, further comprising:
converting, by the PFC unit, the AC power to the DC power of the different operable value based on the different value of the duty cycle parameter; and
providing, by the PFC unit, the DC power of the different operable value to the heating element.

18. A printer comprising:
a heating unit for heating printing fluid to be released on a print medium, the heating unit comprising:
a heating element;
a controller to:
receive a measured actual temperature in the heating unit;
determine a target value of a direct current (DC) voltage for operation of the heating element based on heating element parameters comprising the measured actual temperature; and
compute a value of a duty cycle parameter based on device input parameters and the target value of the DC voltage; and
a power factor correction (PFC) unit comprising a rectifier and coupled to the controller and the heating element, wherein the PFC unit is to:
convert an input alternating current (AC) voltage, received by the PFC unit from an AC supply, to the DC voltage of the target value based on the value of the duty cycle parameter; and
provide the DC voltage of the target value to the heating element.

19. The printer of claim 18, wherein the rectifier is to convert the input AC voltage to an intermediate DC voltage, and wherein the PFC unit further comprises:
an amplifier coupled to the rectifier to produce, from the intermediate DC voltage, the DC voltage of the target value based on the value of the duty cycle parameter.

20. The printer of claim 19, wherein the heating unit further comprises an AC switch to control supply of the input AC voltage to the heating unit, wherein a first end of the AC switch is to receive the input AC voltage from the AC supply, and a second end of the AC switch is coupled to the PFC unit to transmit the input AC voltage to the PFC unit.

21. The printer of claim 20, wherein the controller is coupled to the AC switch to measure the device input parameters.

* * * * *